United States Patent Office 3,846,213
Patented Nov. 5, 1974

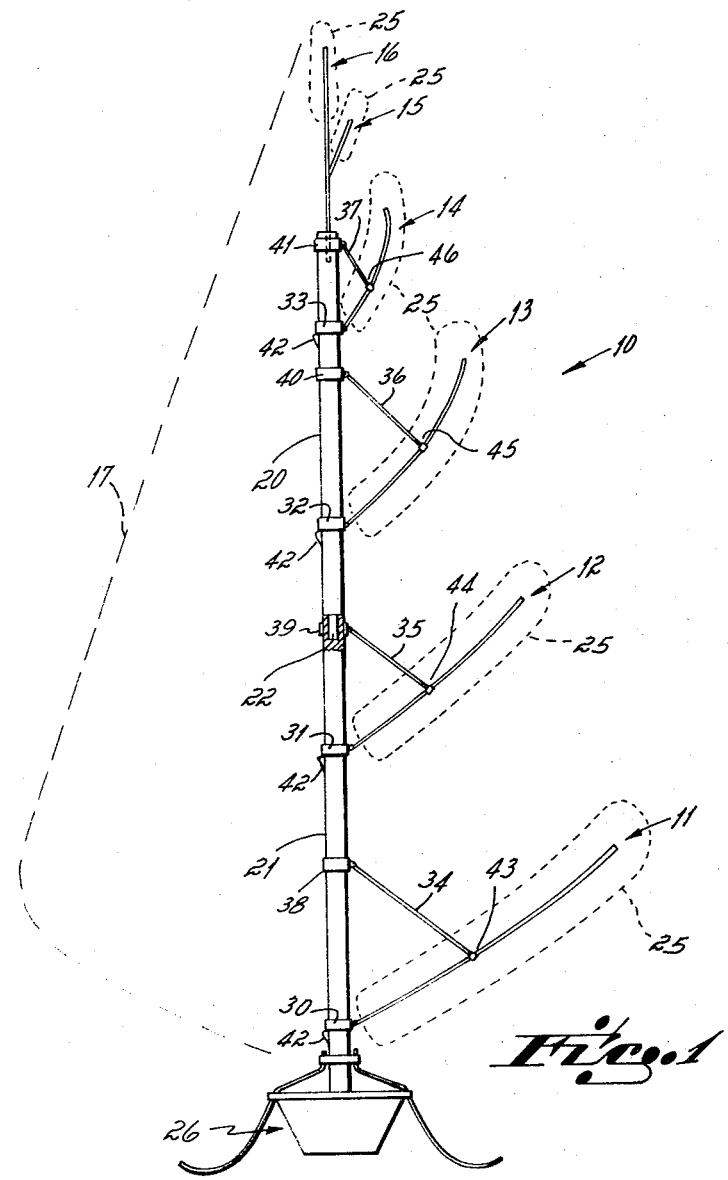
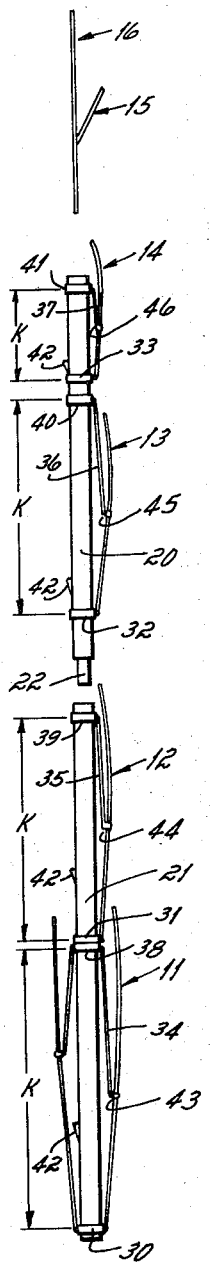
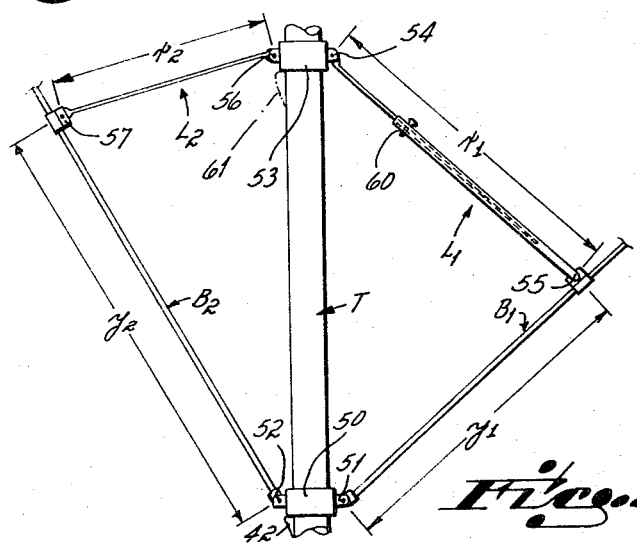

3,846,213
FOLDABLE ARTIFICIAL CHRISTMAS TREE
Norbert Thiemann, 544 Claymore Terrace,
Cincinnati, Ohio 45238
Filed July 24, 1972, Ser. No. 274,456
Int. Cl. A47g 33/06
U.S. Cl. 161—17                         4 Claims

ABSTRACT OF THE DISCLOSURE

A foldable artificial Christmas tree has a plurality of branches spaced in tiers, branches in the lower tiers being longer than branches in the upper tiers to provide a natural Christmas tree configuration when extended. In addition, the branches in each tier extend from the trunk of the tree at varying angles of extension to provide a natural appearance. In order that each branch can be folded equally against the tree trunk for compactness in storage, and to maintain the angular extension variation, the branches are pivoted at lower ends to the trunk and branch links are pivoted between the trunk and intermediate points on the branch. The sum of the length of a link and of the length between the respective pivot point of the lower end of a respective branch and the intermediate point on the branch to which the link is attached is a constant for all branches and links in a given tier. Alternately, the length of the links can be adjusted after tree erection to vary the branch extension angles.

---

This invention relates to artificial Christmas trees and more particularly to artificial Christmas trees which may be folded or collapsed for storage in the off-season.

Artificial Christmas trees have the advantage of providing use of a single tree over a period of years, thereby reducing the normal yearly expense for a natural cut tree. It is highly desirable to construct the artificial trees so that they can easily be disassembled, folded or collapsed for storage.

Artificial Christmas trees have heretofore commonly displayed a uniformity of branch positioning and angulation to enable all branches to be folded or collaped equally. Such uniformity has led to an artificial and unnatural uniformity of appearance in the assembled tree which detracts from its aesthetic quality. This effect is most pronounced in those trees whose branches are formed in tiers from top to bottom so as to project the unattractive and unnatural appearance of a plurality of separate rings or tiers of branches.

It has thus been one objective of my invention to provide a foldable artificial Christmas tree having tiers of branches wherein the branches of a given tier extend from the trunk of the tree at different angles when erected, and yet which all fold equally toward the trunk for storage purposes. A tree provided with this feature is very natural looking and yet is easily and compactly folded for storage during the off-season.

To this end, I provide a foldable artificial Christmas tree having a plurality of branches spaced in tiers. The branches within a tier extend from the trunk of the tree at different angles of extension. The branches are pivoted at one end to the trunk of the tree, and a link is connected between an intermediate point on the branch and the tree trunk. To obtain the varying angles of branch extension within a tier and yet provide for folding each branch in the tier equally against the tree trunk for compactness, the sum of the length of the link and of the length between a branch's lower pivot point and its intermediate point to the link is maintained a constant for all links and branches in a tier.

The trunk pivot points for the links and for the branches are movable with respect to each other to accommodate folding of the links and branches along the trunk. The pivot points of either the links or the branches may be fixed on the trunk while the other points are positioned on a collar which is slidable on the trunk. A stop or detent is provided for holding the slidable collar in a branch-extended attitude.

Alternately, the length of a link can be adjusted after assembly to change the angle of extension. The link is then readjusted prior to folding.

The invention provides a very natural appearing tree with branches actually in tiers but being extended at random angles in a natural manner. When stored, the branches are all folded compactly along the tree trunk. Since the links and branches are constructed in the prescribed manner, no branch extends outwardly of the folded tree regardless of whatever its assembled angle of extension may have been.

These and other objects and advantages will become readily apparent from the following detailed description and drawing in which:

FIG. 1 is a side view, partly in section, showing a tree and selected branches and links of each tier in an assembled or erected attitude, FIG. 2 is a disassembled side view showing the sections of a tree with selected branches and links of each tier in a folded, collapsed attitude, and FIG. 3 is a detailed view showing two branches and their respective links in a single tier.

Now referring particularly to the drawing, FIG. 1 depicts at 10 a foldable artificial Christmas tree in an assembled condition. For purposes of clarity, only one branch in each tier, designated as 11 through 16 respectively, is shown. It will be understood, however, that each tier normally comprises at least two or more branches. The general outline of the erected tree is shown by the depicted branches and the dotted line 17.

The tree 10 includes a trunk assembled from two major sections 20 and 21. Each of these sections is shown supporting two tiers of branches, but any number of sections supporting any number of tiers could be utilized. The two sections 20 and 21 are assembled into an integral trunk by means connecting the two sections together. In the embodiment shown in FIG. 1, a dowel 22 is provided on the lower end of the upper trunk section 20. The dowel or pin 22 extends into a recess or socket in the upper end of the lower trunk section 21 and is fitted to maintain the two sections in a generally coaxial position.

In the preferred embodiment, each of the upper and lower trunk sections supports two major tiers of branches. When the trunk sections are properly assembled, the length of the branches in a tier is slightly longer than the branches of the tier immediately above it so that when assembled and extended, the branches form a general tree outline circumferentially about the trunk of the tree as previously described.

Each of the branches is provided with a synthetic material 25 which resembles the natural needlelike structure of any variety of tree commonly used as a Christmas tree, according to conventional practice. This synthetic material may be manufactured to resemble any of the various types of needle configurations.

When it is desired to assemble the tree, the lowermost end of the lower trunk section 21 can be secured in a typical Christmas tree stand 26 in order to support the trunk of the tree in a generally upright attitude. Auxiliary branches 15 and 16 are fitted into the uppermost portion of the upper trunk section 20 in order to complete the tree configuration.

With the exception of the sizes of the various parts, each of the branches and folding mechanisms are constructed in a generally similar manner. In the preferred embodiment, the branches of each tier are pivoted at their lower ends respectively to sliding collars 30–33. A link or arm is provided for each branch in the tree, the depicted links being designated by numerals 34–37 respectively. The links of each tier are pivoted at one end to a fixed collar, 38–41 respectively. The other end of each link is pivoted at an intermediate point to a branch as shown at 43–46, respectively.

For holding the slidable collars 30–33 in a position to maintain the branches in an extended attitude, a stop means 42 is provided in the trunk to cooperate with each of the sliding collars 30–33. The stop means may take any form and, as shown, comprises simply a spring-loaded detent which is depressible into the trunk to permit the respective collar to slide over it. Upon release, the stop extends from the trunk to block downward movement of its respective collar until the stop is manually pressed into the trunk to allow passage of the collar and subsequent folding of the branches against the trunk.

As previously described, the links and branches of each tier in the tree are pivoted to the same respective collars. As an example, all of the branches in the lower tier are pivoted to the slidable collar 30, and all of the links in that tier are pivoted to the fixed collar 38, respectively. The branches and links of the next tier are pivoted to the slidable collar 31 and fixed collar 39, respectively, and so on for each tier. In order to vary the angle of extension of the individual branches from the trunk, the length of the respective branch link could be varied. In general, however, if the links on a given collar are not of equal length, those branches connected to longer links will extend outwardly from the trunk even when folded, thus rendering the folded tree very cumbersome and space consuming.

In order to overcome this problem and yet provide for varying angles of extension of branches within a single tier, the branches and links of the invention are constructed so that the sum of the length of a link within a tier and the length between the collar pivot and the intermediate link connecting point on the respective branch equals constant for all branches and links in a given tier. FIG. 3 illustrates this correlation. In this figure, two branches of a single tier are shown; however, it is understood that other branches can be provided in the tier as well and are connected to the respective collars in a manner similar to that as will be described.

As shown in FIG. 3, branch $B_1$ is connected to slidable collar 50 at pivot point 51. Branch $B_2$ is connected to the slidable collar 50 at pivot point 52. The link $L_1$ (which is integral but could be adjustable as shown and as hereinafter described) is pivoted to fixed collar 53 at pivot point 54 and is pivoted to the branch $B_1$ at intermediate branch point 55. Link $L_2$ is pivoted to fixed collar 53 at pivot point 56 and is pivoted to the branch $B_2$ at intermediate branch point 57. The link $L_1$ has a length $X_1$, and the distance between pivot point 51 and intermediate point 55 on branch $B_1$ is $Y_1$. The link $L_2$ has a length $X_2$, and the distance between pivot point 52 and intermediate branch point 57 on branch $B_2$ is $Y_2$. The lengths $X_1$, $X_2$, $Y_1$ and $Y_2$ are constructed so that: $X_1+Y_1=X_2+Y_2=K$. Thus, regardless of the particular X and Y lengths in any given branch, their sum always equals K. When the branches $B_1$ and $B_2$ are folded generally parallel to and against the trunk T, and when the slidable collar 50 is lowered to fold or collapse the assembly, all branches will be close to the trunk and none will project significantly differently than the others. Two folded branches in the same tier are shown in the bottom tier in FIG. 2.

It can be appreciated that, for each tier the value of K should be different from the preceding tier due to the difference in the size of the branches. This is shown in FIG. 2 where the value of K decreases from lower to upper tiers. Thus for any given tier the general formula applicable to all links and branches in the tier is $X_n+Y_n=K_n$.

While in the preferred embodiment the collars pivoting the branches are slidable, and the collars pivoting the links are fixed, the function of the slidable collar and the fixed collar could be reversed so that the lower collar for any tier is fixed and the upper collar is slidable. The stops could be relocated on the trunk accordingly. This is shown in FIG. 3 in phantom at 61.

It will also be appreciated that, alternately, all of the branch lengths between the lower pivot point on the collars and the intermediate point to which the link is attached could be equal, and the length of each link could be changed or adjusted after the branches were extended, to accommodate different angles of extension. To this end, a telescoping or adjustable length link, such as shown at 60 in FIG. 3, may be utilized to set the branches at different angles. The links for any tier would then have to be readjusted to equal length upon folding or collapsing the whole assembly in order to provide the most compact storable unit.

While I have described a preferred embodiment of my invention, other variations and modifications will become readily apparent to those of ordinary skill in the art and I intend to be bound only by the appended claims.

I claim:

1. A foldable artificial tree having a trunk and a plurality of tiers of branches of different lengths, the length of the branches in upper tiers being less than the length of branches in lower tiers, and means mounting said branches to said trunk for folding the branches of each tier inwardly toward said trunk, the mounting means comprising:

a link for each branch in said tree, each link being pivoted at one end to an intermediate point on its respective branch, the links within a tier being of different lengths so that when the tree is in erect condition the links hold the branches in a given tier at angles which differ from branch to branch, each tier having associated with it a first means on the trunk pivotally mounting the inner ends of the links of the respective tier, each tier also having associated with it a second means on the trunk pivotally mounting the lower ends of the branches of the respective tier, one of said first and second means being slidable along said trunk with respect to the other of said first and second means, the sum of the length of a link and the distance between the lower end of the respective branch and the intermediate point to which the link is attached being a constant for all branches and links in a given tier.

2. A foldable artificial tree as in Claim 1 including means for adjusting the length of each link.

3. A foldable artificial tree as in Claim 1 including releasable stop means in said trunk for holding the slidable one of said means in a position to maintain the extension of said branches and to release the slidable one of said means for folding said branches against said trunk.

4. A foldable artificial tree having a trunk and a plurality of tiers of branches of different lengths, the length of the branches in upper tiers being less than the length of branches in lower tiers, wherein said branches extend at angles from said trunk and the branches in a given tier extend from said trunk at angles which differ from branch to branch in the tier, and means mounting said branches to said trunk for folding the branches of each tier inwardly toward said trunk, the mounting means comprising:

a link for each branch in said tree, each link being pivoted at one end to an intermediate point on its respective branch, each tier having associated with it a first means on the trunk pivotally mounting the inner ends of the links of the respective tier, each tier also having associated with it a second means on the trunk pivotally mounting the lower ends of the branches of the respective tier, one of said first and second means being slidable along said trunk with respect to the other of said first and second means, each link comprising two sections which partially overlap one another lengthwise, one section being pivoted at an end thereof to the said intermediate point on its respective branch, the other section being pivotally connected at an inner end to said first means, releasable means for securing the two said sections together at different positions for changing the amount of overlap between them, thereby to change the angle of the respective branch with respect to the trunk.

the overall lengths of the links differing when the tree is erected so that they hold the branches of a given tier at angles which differ from branch to branch.

References Cited

UNITED STATES PATENTS

| | | | |
|---|---|---|---|
| 843,712 | 2/1907 | Straub | 211—178 A |
| 1,590,220 | 6/1926 | Wurts | 161—24 XR |
| 438,517 | 10/1890 | Adams | 211—178 A XR |
| 835,445 | 11/1906 | Leonard | 161—23 XR |
| 3,194,409 | 7/1965 | Midouhas | 211—178 A |
| 1,587,475 | 6/1926 | Davis | 135—26 |
| 1,613,287 | 1/1927 | Moser | 135—26 |
| 1,781,372 | 11/1930 | Denecke | 248—122 |
| 2,280,476 | 4/1942 | Calvert | 248—122 X |
| 3,313,929 | 4/1967 | Schiavone | 240—2 R |
| 3,424,317 | 1/1969 | Singer | 211—178 A |

HAROLD ANSHER, Primary Examiner

H. F. EPSTEIN, Assistant Examiner

U.S. Cl. X.R.

135—31; 161—22; 211—178 A; 248—122